United States Patent
Tang et al.

(10) Patent No.: US 12,352,981 B2
(45) Date of Patent: Jul. 8, 2025

(54) DISPLAY DEVICE AND ELECTRONIC APPARATUS

(71) Applicant: HKC CORPORATION LIMITED, Shenzhen (CN)

(72) Inventors: Rong Tang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 260 days.

(21) Appl. No.: 18/086,605

(22) Filed: Dec. 21, 2022

(65) Prior Publication Data
US 2023/0341698 A1    Oct. 26, 2023

(30) Foreign Application Priority Data
Apr. 25, 2022    (CN) .......................... 202210438696.0

(51) Int. Cl.
*G02B 27/28*    (2006.01)
*G02F 1/1335*    (2006.01)

(52) U.S. Cl.
CPC ...... *G02B 27/281* (2013.01); *G02F 1/133531* (2021.01); *G02F 1/133553* (2013.01)

(58) Field of Classification Search
None
See application file for complete search history.

(56) References Cited

U.S. PATENT DOCUMENTS

| | | | |
|---|---|---|---|
| 11,714,313 B1 * | 8/2023 | Tang | G02F 1/133528 349/56 |
| 2018/0069995 A1 * | 3/2018 | Lim | G02B 13/0055 |
| 2020/0286436 A1 * | 9/2020 | Lim | G01J 1/02 |
| 2020/0310210 A1 * | 10/2020 | Zhang | H10K 59/50 |
| 2021/0223619 A1 * | 7/2021 | Zhou | G02F 1/13338 |
| 2021/0349344 A1 * | 11/2021 | Koito | G02F 1/133514 |
| 2021/0351261 A1 * | 11/2021 | Kim | H10K 59/131 |
| 2023/0176442 A1 * | 6/2023 | Kim | H10K 59/50 |

FOREIGN PATENT DOCUMENTS

| | | |
|---|---|---|
| CN | 212905782 U | 4/2021 |
| CN | 114236895 A | 3/2022 |

* cited by examiner

*Primary Examiner* — Ryan Crockett

(57) ABSTRACT

A display device and an electronic apparatus are disclosed. The display device includes a display panel, an upper polarizer and a lower polarizer, and further includes a housing, a control structure, and a polarizing structure. The control structure is connected to the housing. The lower polarizer defines an opening corresponding to the camera module. The polarizing structure is arranged corresponding to the opening. The control structure controls the polarizing structure to move or rotate relative to the lower polarizer at the opening. When the control structure is in a non-operating state, a polarization orientation of the polarizing structure at the opening is perpendicular to a polarization orientation of the upper polarizer. When the control structure is in an operating state, the polarization orientation of the polarizing structure at the opening is parallel to the polarization orientation of the upper polarizer, or the polarizing structure is moved out of the opening.

14 Claims, 5 Drawing Sheets

DISPLAY DEVICE AND ELECTRONIC APPARATUS

CROSS-REFERENCE TO RELATED APPLICATIONS

This application claims the priority and benefit of Chinese patent application 2022104386960, entitled "Display Device and Electronic Apparatus" and filed Apr. 25, 2022, with China National Intellectual Property Administration, the entire contents of which are incorporated herein by reference.

TECHNICAL FIELD

The present application relates to the field of display technology, and in particular, to a display device and an electronic apparatus.

BACKGROUND

Nowadays, with the rapid development of display technology, electronic devices such as mobile phones, computers, and televisions play a very important role in people's lives, and users have higher and higher demand for products, such as appearance, performance, price, etc. The full-screen design represented by the under-screen camera technology is more and more sought after by major manufacturers and users due to its high screen-to-body ratio and simple and beautiful appearance.

For under-screen camera products, the camera module is arranged corresponding to the display device. The display device usually further includes a polarizer, which can reduce the surface reflection of the display device and improve the contrast effect. However, the transmittance of the polarizer is low, which will have a certain impact on the camera module, and there is a problem that the captured image is not clear. If a hole is directly drilled or a transparent area is set on the polarizer at the position corresponding to the camera module, the appearance and display effect of the display device will be affected. Therefore, how to improve the local light transmittance of the display device without affecting the appearance and display effect, so as to be suitable for products with imaging functions, has become a technical problem to be solved urgently in the art.

SUMMARY

It is therefore a purpose of this application to provide a display device and an electronic apparatus, which can adjust the light transmittance at the opening by changing the state of the polarized light structure, so as to ensure the appearance and display effect, and are also suitable for under-screen camera equipment.

The present application discloses a display device including a display panel, an upper polarizer and a lower polarizer. The upper polarizer is arranged on the side of a light-emitting surface of the display panel. The lower polarizer is arranged on the side of a light incident surface of the display panel. The display device further includes a housing, a control structure and a polarizing structure. The control structure is connected to the housing. The lower polarizer is provided with an opening corresponding to the camera module, and the polarizing structure is arranged corresponding to the opening. The control structure controls the polarizing structure to move or rotate relative to the lower polarizer at the opening. When the control structure is in a non-operating state, the polarization orientation of the polarizing structure at the opening is perpendicular to the polarization orientation of the upper polarizer. When the control structure is in the operating state, the polarization orientation of the polarizing structure at the opening is parallel to the polarization orientation of the upper polarizer, or the polarizing structure moves out of the opening.

Optionally, the polarizing structure is arranged in the opening. The control structure includes a rotation mechanism, the rotation mechanism is connected to the housing, and the rotation mechanism is connected to the polarizing structure, and controls the polarizing structure to rotate in the opening. When the polarization orientation of the polarizing structure is rotated to be perpendicular to the polarization orientation of the upper polarizer, the control structure is in the non-operating state. When the polarization orientation of the polarizing structure is rotated to be parallel to the polarization orientation of the upper polarizer, the control structure is in the operating state.

Optionally, the rotation mechanism includes a support body, a rotary gear and a drive motor. The rotary gear is arranged on the housing. The support body is hollow inside. The edge of one end of the support body is fixedly connected with the polarizing structure, and the other end is connected with the rotary gear. The driving motor is connected with the rotary gear and drives the rotary gear to rotate.

Optionally, the cross-sectional width of the support body gradually increases from the end adjacent to the polarizing structure to the end adjacent to the camera module. The inner wall of the support body is provided with a reflective layer, or the support body is made of a reflective material.

Optionally, the control structure includes a moving mechanism, the moving mechanism is connected to the housing, and the moving mechanism is connected to the polarizing structure, so as to control the polarizing structure to block or move out of the opening. When the polarizing structure blocks the opening, and the polarization orientation of the polarizing structure is perpendicular to the polarization orientation of the upper polarizer, the control structure is in the non-operating state. When the polarizing structure is moved out of the opening and there is no polarization orientation at the opening, the control structure is in the operating state.

Optionally, the polarizing structure is arranged in the opening. The moving mechanism includes a connecting stage, a moving belt and a moving motor group. The moving belt is connected to the housing. One end of the connecting stage is connected with the polarizing structure, and the other end is connected with the moving belt. The mobile motor group includes a first motor and a second motor. The first motor and the second motor are each connected with the moving belt, and the first motor drives the moving belt to move in the vertical direction, and the second motor drives the moving belt in the horizontal direction move.

Optionally, the polarizing structure is arranged on the side of the lower polarizer away from the display panel. The moving mechanism includes a connecting stage, a moving belt and a third motor. The moving belt is connected to the housing. One end of the connecting stage is connected with the polarizing structure, and the other end is connected with the moving belt. The third motor is drivingly connected with the moving belt, and drives the moving belt to move in the horizontal direction.

Optionally, the projected area of the polarizing structure on the lower polarizer is greater than or equal to the cross-sectional area of the opening.

The present application further discloses an electronic device, comprising a camera module and any one of the display devices disclosed in the present application, wherein the camera module corresponds to the position of the opening.

Optionally, the cross-sectional area of the opening is greater than or equal to the orthographic projected area of the camera module on the lower polarizer.

Compared with the scheme of directly digging a hole or setting a transparent area in the polarizer corresponding to the position of the camera module, which affects the appearance and display effect, in the present application, an opening corresponding to the camera module is provided in the lower polarizer, and a housing, a control structure and a polarizing structure are also provided, where the polarizing structure is disposed corresponding to the position of the opening, and the control structure controls the movement of the polarizing structure relative to the lower polarizer at the opening. By changing the working or non-operating state of the control structure, the state of the polarizing structure is changed, and the transmittance at the corresponding opening position is adjusted so that the opening position can be in a light-shielding or light admission state or light-transmitting state. When the control structure is in a non-operating state, the opening position is in a light-shielding state, and the display device displays normally. When the control structure is in the operating state, the position of the opening is in the light admission state, which can be applied to the device with the under-screen shooting function. Only by adjusting the operating state of the control structure, the opening can be in the light-shielding or light admission state, which is easy to operate and has stronger adaptability. Furthermore, the polarizing structure is located inside the display device, which does not affect the appearance of the display device, ensures the display effect of the display device, further enhances the comprehensive performance of the display device, and improves the market competitiveness of the display device.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

Figure 1:
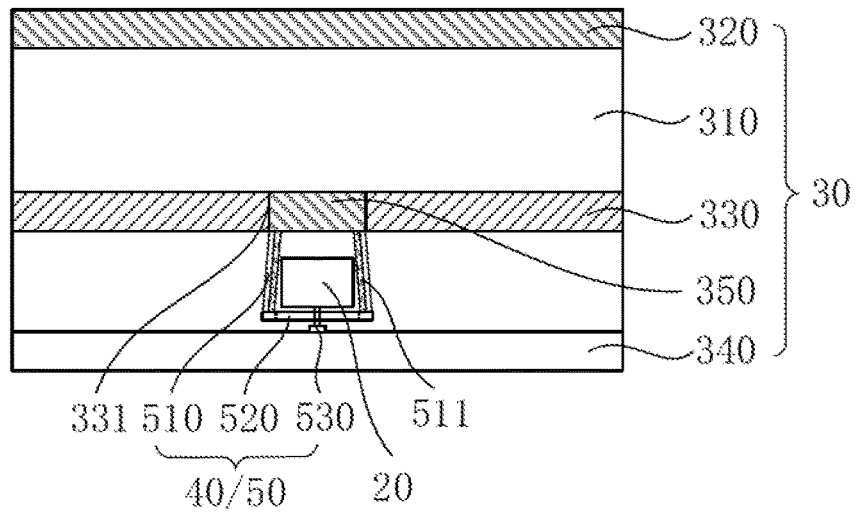
FIG. 1 is a schematic diagram of an electronic apparatus of the present application.

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", or the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

FIG. 1 is a schematic diagram of an electronic apparatus of the present application. Referring to FIG. 1, the present application discloses an electronic device 10 including a camera module 20 and a display device 30. The display device 30 is provided with an opening 331 corresponding to the camera module 20. The camera module 20 is connected to the display device 30. The camera module 20 corresponds to the position of the opening 331 to form a device with an under-screen shooting function. The camera module 20 of the present application may be a structure with an image capture function, such as a camera. The electronic device 10 may be a mobile phone, a computer, a television, or the like. When the electronic device 10 does not need to perform a photographing operation, the camera module 20 is in a light-shielding state to ensure a better display effect. When the electronic device 10 is used for photography, the camera module 20 can be adjusted to be in a light admission state or light-transmitting state, and the light from the outside can be transmitted to the camera module 20 through the display device 30 to improve the clarity of the captured image by the camera, thereby improving the user's sense of experience. In addition, the adjustment method of the light transmittance of the display device 30 corresponding to the position of the camera module 20 is simple and easy to implement, so that the market competitiveness of the electronic device 10 is stronger.

This application mainly makes targeted improvements to the display device 30 in the electronic device 10, and the specific improvements are as follows.

Embodiment 1

Figure 2:
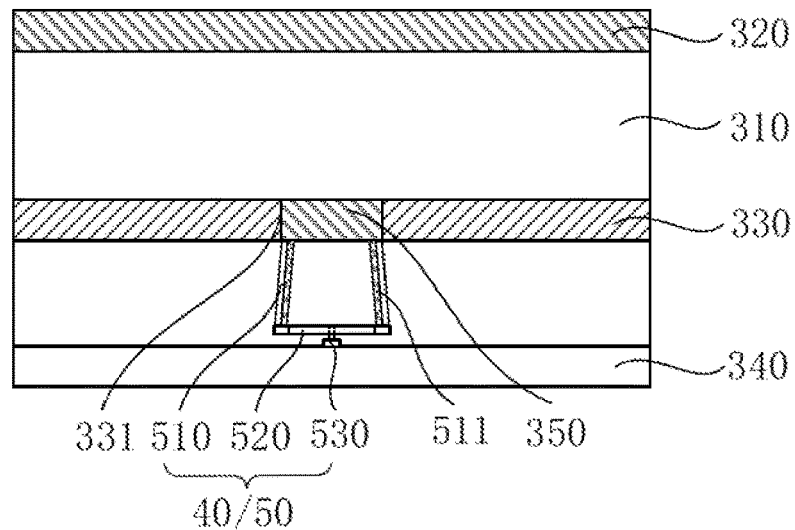
FIG. 2 is a schematic diagram of a display device according to an embodiment of the present application.
Figure 3:
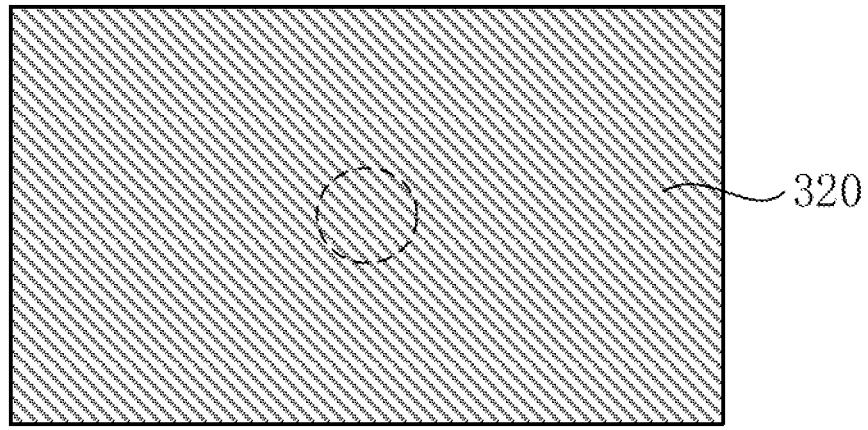
FIG. 3 is a schematic top view of a polarizer on the first embodiment of the present application.
Figure 4:
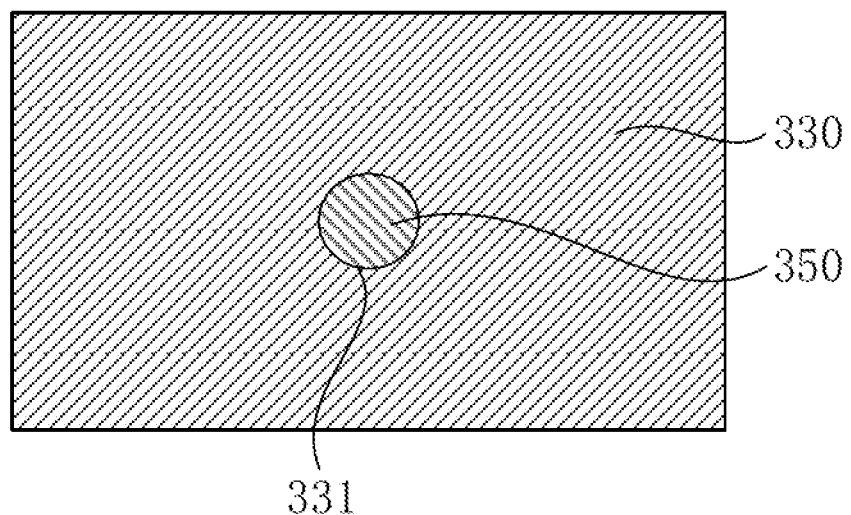
FIG. 4 is a schematic top view of a polarizer in in a shooting state in an embodiment of the present application.

FIG. 2 is a schematic diagram of a display device according to an embodiment of the present application. FIG. 3 is a schematic top view of a polarizer on the first embodiment of the present application. FIG. 4 is a schematic top view of a polarizer in an embodiment of the present application in a shooting state. Referring to FIGS. 2-4, as the first embodiment of the present application, a display device 30 is disclosed, including a display panel 310, an upper polarizer 320 and a lower polarizer 330. The upper polarizer 320 is arranged on the side of a light-emitting surface of the display panel 310. The lower polarizer 330 is arranged on the side of a light incident surface of the display panel 310. The display device 30 further includes a housing 340, a control structure 40, and a polarizing structure 350. The control structure 40 is connected to the housing 340. The lower polarizer 330 is provided with an opening 331 corresponding to the camera module 20. The polarizing structure 350 is arranged corresponding to the opening 331. The control structure 40 controls the polarizing structure 350 to move or rotate relative to the lower polarizer 330 at the opening 331. When the control structure 40 is in the non-operating state, the polarization orientation of the polarizing structure 350 at the opening 331 is perpendicular to the polarization orientation of the upper polarizer 320. When the control structure 40 is in the operating state, the polarization orientation of the polarizing structure at the opening 331 is parallel to the polarization orientation of the upper polarizer 320, or the polarizing structure 350 is moved out of the opening 331.

Compared with the solution of directly digging a hole or arranging a transparent area in the polarizer corresponding to the camera module, which affects the appearance and display effect, in the present application, the lower polarizer 330 is provided with an opening 331 corresponding to the camera module, and further provided with a housing 340, a control structure 40 and a polarizing structure 350. The polarizing structure 350 is arranged corresponding to the position of the opening 331. The control structure 40 controls the polarizing structure 350 to move relative to the lower polarizer 330 at the opening 331, and the position of the polarizing structure 350 is changed by changing the operating state or non-operating state of the control structure 40, to adjust the light transmittance at the position corresponding to the opening 331, so that the opening 331 can be in a light-shielding or light admission state. When the control structure 40 is in a non-operating state, the position of the opening 331 is in a light-shielding state, and the display device 30 displays normally. When the control structure 40 is in the operating state, the position of the opening 331 is in the light admission state, which can be applied to the device with the under-screen shooting function. Only by adjusting the operating state of the control structure 40, the opening 331 can be in a light-shielding or light admission state, which is easy to operate and has stronger adaptability. Furthermore, the polarizing structure 350 is located inside the display device 30, and so does not affect the appearance of the display device 30, which ensures the display effect of the display device 30, further enhances the overall performance of the display device 30, and improves the market competitiveness of the display device 30.

In order to ensure that the size of the opening 331 is sufficient to allow the camera angle of the camera module 20 to completely pass, the cross-sectional area of the opening 331 is set to be greater than or equal to the orthographic projected area of the camera module 20 on the lower polarizer 330. When the cross-sectional area of the opening 331 is equal to the orthographic projected area of the camera module 20 on the lower polarizer 330, the size of the opening 331 is just enough to allow the shooting angle of view of the camera module 20 to pass through, which is beneficial for a more compact product structure. When the cross-sectional area of the opening 331 is set to be larger than the orthographic projected area of the camera module 20 on the lower polarizer 330, it not only facilitates the complete penetration of the camera angle of the camera module 20, but also prevents the edge of the camera module 20 from being blocked by the hole wall of the opening 331, solving the problem that when the camera module 20 is shooting, black shadows appear on the edges of the image, which affects the imaging effect.

In this embodiment, the ratio of the cross-sectional area of the opening 331 to the orthographic projected area of the camera module 20 on the lower polarizer 330 is set to be between 1:1 and 1.2:1 (including 1:1 and 1.2:1). While ensuring the viewing angle of the camera, it can also avoid that the size of the opening 331 is too large to affect the display effect of the display device 30.

It should be noted that the cross-sectional area of the opening 331 refers to the horizontal cross-sectional area of the opening 331. In addition, when installing the camera module 20, the center of the opening 331 can be set to coincide with the center of the camera module 20, so that the light transmitted through the opening 331 can all enter the shooting area of the camera module 20, so as to avoid ghost images at the edges which may affect the imaging quality. Furthermore, the shape of the opening 331 can be designed according to the shape of the camera module 20 in the electronic device 10, and targeted improvements can be made. The shape of the opening 331 may be set to be similar to that of the camera module 20. For example, when the camera module 20 is a cylinder, the opening 331 can be set as a columnar through hole. When the camera module 20 is a rectangular parallelepiped, the opening 331 can also be set as a rectangular parallelepiped. Also, the shape of the corresponding polarizing structure 350 may be set to be the same as or similar to the shape of the opening 331.

The housing 340 is mainly used to fix the control structure 40. It can be a shell, a back plate or other fixed structures used to support other components, etc. This application takes the case 340 as the back plate as an example for description. The back plate is disposed on the side of the lower polarizer 330 away from the display panel 310, and the camera module 20 can be fixed on the back plate or on other housings 340 to achieve a fixing effect.

Furthermore, when the control structure 40 is in a non-operating state, the polarization orientation of the polarizing structure 350 at the opening 331 is perpendicular to the polarization orientation of the upper polarizer 320, and the opening 331 is shielded from light, and the display device 30 can display normally. At this time, it may refer to the state when the camera module 20 is not taking pictures. When the control structure 40 is in the operating state, the polarization orientation of the polarizing structure 350 at the opening 331 is parallel to the polarization orientation of the upper polarizer 320, or the polarizing structure 350 is moved out of the opening so that there is only the polarization orientation of the upper polarizing plate 320, and so the opening 331 is in a light admission state. At this time, it may refer to the state in which the camera module 20 is capturing a picture or in other words in a shooting state.

When the control structure 40 controls the polarizing structure 350 to be rotatable relative to the lower polarizer 330 at the opening 331 in a rotating manner to realize switching between the operating state and the non-operating state, the polarizing structure 350 can be arranged in the opening 331, and can be rotated horizontally relative to the lower polarizer 330 in the opening 331. The control structure 40 includes a rotation mechanism 50. The rotation mechanism 50 is connected to the housing 340, and the rotation mechanism 50 is connected to the polarizing structure 350, and controls the polarizing structure 350 to rotate in the opening 331. When the polarization orientation of the polarizing structure 350 is rotated to be perpendicular to the polarization orientation of the upper polarizer 320, the control structure 40 is in a non-operating state. When the polarization orientation of the polarizing structure 350 is rotated to be parallel to the polarization orientation of the upper polarizer 320, the control structure 40 is in the operating state.

When the camera module 20 does not take pictures, the polarization orientations of the upper polarizer 320 and the lower polarizer 330 are generally perpendicular to each other. Therefore, the cooperation of the upper polarizer 320 and the lower polarizer 330 can achieve the effect of full shading, and the display panel 310 no longer receives light from the outside, thereby ensuring the normal display effect of the display device 30. In this embodiment, the lower polarizer 330 is provided with a polarizing structure 350 at a position corresponding to the opening 331, the polarizing structure 350 is arranged in the opening 331, and the polarizing structure 350 can be rotated horizontally in the opening 331. The control structure 40 includes a rotation mechanism 50. The rotation mechanism 50 can be arranged on the back plate. The rotation mechanism 50 is connected with the polarizing structure 350, and controls the polarizing structure 350 to rotate in the opening 331 through the rotation mechanism 50. When the polarization orientation of the polarizing structure 350 is rotated to be perpendicular to the polarization orientation of the upper polarizer 320, the control structure 40 is in the operating state, and the camera module 20 corresponding to the opening 331 is in a light-shielding state, so that the camera module 20 is shielded from light to ensure the display effect.

Furthermore, when the polarization orientation of the polarizing structure 350 is rotated to be parallel to the polarization orientation of the upper polarizer 320, the control structure 40 is in the operating state, and the camera module 20 corresponding to the opening 331 is in a light admission state, so that the position of camera module 20 is light-transmitting and can receive external light, thus realizing the shooting function. In this application, the cross section of the camera module 20 is a circle, the opening 331 is set as a cylindrical through hole, and the polarizing structure 350 is a truncated cylinder as an example, and the diameter of the polarizing structure 350 is set to be equal to the diameter of the opening 331, so that the polarizing structure 350 is just fitted in the opening 331, so as to avoid a gap between the polarizing structure 350 and the opening 331, which will affect the display effect.

Specifically, the rotation mechanism 50 includes a support body 510, a rotary gear 520 and a driving motor 530. The rotary gear 520 is arranged on the housing 340. The support body 510 is hollow inside. The edge of one end of the support body 510 is fixedly connected with the polarizing structure 350, and the other end is connected with the rotary gear 520 in a driving manner. The driving motor 530 is connected to the rotary gear 520 and drives the rotary gear 520 to rotate.

The rotation mechanism 50 can be fixed to the back plate. The interior of the support body 510 is hollow and so the support body 510 can be set as a hollow cylinder. Furthermore, the edge of one end of the support body 510 is fixedly connected with the polarizing structure 350, and the other end is connected with the rotary gear 520 in a driving manner. In this way, the rotary gear 520 can be arranged between the lower polarizer 330 and the back plate. The camera module 20 can be installed between the rotary gear 520 and the back plate. At this time, a hollow area can also be set in the center of the rotary gear 520, so that the light transmitted by the polarizing structure 350 can pass through the hollow area, so that the camera module 20 can take pictures normally. Of course, the camera module 20 can also be installed between the rotary gear 520 and the lower polarizer 330, that is, the camera module 20 is located above the rotary gear 520, which facilitates the fixing of the rotary gear 520. Furthermore, the driving motor 530 is connected with the rotary gear 520. When the driving motor 530 is powered on, the rotary gear 520 is driven to rotate in the horizontal direction, so as to drive the polarizing structure 350 to rotate horizontally through the support body 510, thereby changing the polarization orientation of the polarizing structure 350, so that the position of the camera module 20 corresponding to the opening 331 is in a light-shielding or light admission state corresponding to the opening 331, so as to ensure the normal shooting function of the camera module 20 and ensure the display effect of the display device 30.

In this application, the camera module 20 is set in the support body 510 and is installed between the rotary gear 520 and the lower polarizer 330, that is, the rotary gear 520 is located below the camera module 20 as an example for description. The support body 510 is a cylinder that is hollow inside, and the camera module 20 is arranged inside the support body 510. When the camera module 20 enables the shooting function, the opening 331 is in a light admission state, the support body 510 receives the light transmitted through the polarizing structure 350, and enables the camera module 20 to receive the light. The support body 510 also has the effect of concentrating light, which increases the brightness of the light when the camera module 20 takes pictures, which further enhances the picture quality of the pictures. In addition, the rotary gear 520 is arranged below the camera module 20, which is also convenient for installation and disassembly, which is beneficial to the assembly of the display device 30. Furthermore, when the rotation state of the polarizing structure 350 is abnormal, disassembly and maintenance are also facilitated, the installation efficiency is improved, and the service life of the display device 30 is prolonged.

Further, the cross-sectional width of the support body 510 gradually increases from the end adjacent to the polarizing structure 350 to the end adjacent to the camera module 20. The inner wall of the support body 510 is provided with a reflective layer 511, or the support body 510 is made of a reflective material. In order to enhance the light-concentrating effect of the support body 510, the side surfaces of the support body 510 are set as inclined planes. In addition, the cross-sectional width of the support body 510 is set to gradually increase from the end adjacent to the polarizing structure 350 to the end adjacent to the camera module 20, that is, to form a truncated cone-shaped structure with a small top and a large bottom. The cross-sectional width of the upper end of the support body 510 (the end where the support body 510 is connected to the polarizing structure 350) can be set to be larger than the width of the side of the camera module 20 adjacent to the polarizing structure 350. Specifically, the width of the upper end of the support body 510 may be set to be 1.1 to 1.2 times the width of the camera module 20 on the side adjacent to the polarizing structure 350, so that after entering the support body 510, the light transmitted by the polarizing structure 350 can pass through the gap between the side wall of the support body 510 and the camera module 20 and be collected at the bottom of the support body 510. In addition, the inner wall of the support body 510 is provided with a reflective layer 511, not only on the side wall, the reflective layer 511 is also provided on the surface of the rotary gear 520 adjacent to the camera module 20. In this way, the light in the support body 510 can be used through multiple reflections from the inner walls, which can improve the brightness and utilization of the light. Accordingly, the transmittance of the light in the area of the camera module 20 is enhanced to a certain extent, which is beneficial to improve the image quality.

In addition, the support body 510 can also be made of a reflective material, which can also achieve the effect of focusing light inside the support body 510 and reflecting it multiple times to improve the transmittance of light. In addition, the support body 510 may not be set in the shape of a truncated cone. The support body 510 may be composed of at least two cylindrical posts. One end of the at least two posts is fixedly connected with the edges of the polarizing structure 350, and the other end is engaged with the rotary gear 520. Furthermore, the at least two posts are evenly arranged at the edges of the polarizing structure 350 to ensure the stability of the polarizing structure 350 and avoid tilting of the polarizing structure 350 when the rotary gear 520 drives the posts to rotate. Of course, the support body 510 can also be set in other shapes, as long as the rotation gear 520 can drive the polarizing structure 350 to rotate, so as to ensure that the polarization orientation of the polarizing structure 350 is parallel to the polarization orientation of the upper polarizer 320 when the camera module 20 needs to take a picture.

Embodiment 2

Figure 5:
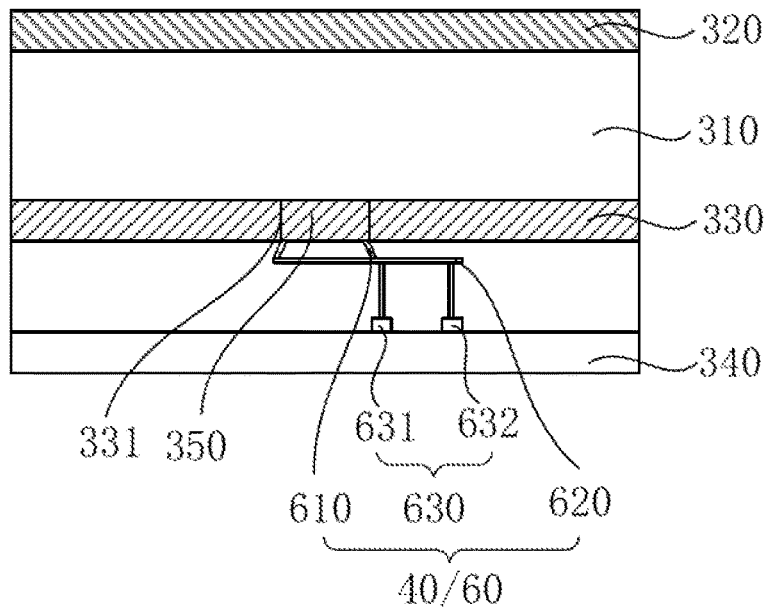
FIG. 5 is a schematic diagram of a display device according to a second embodiment of the present application.
Figure 6:
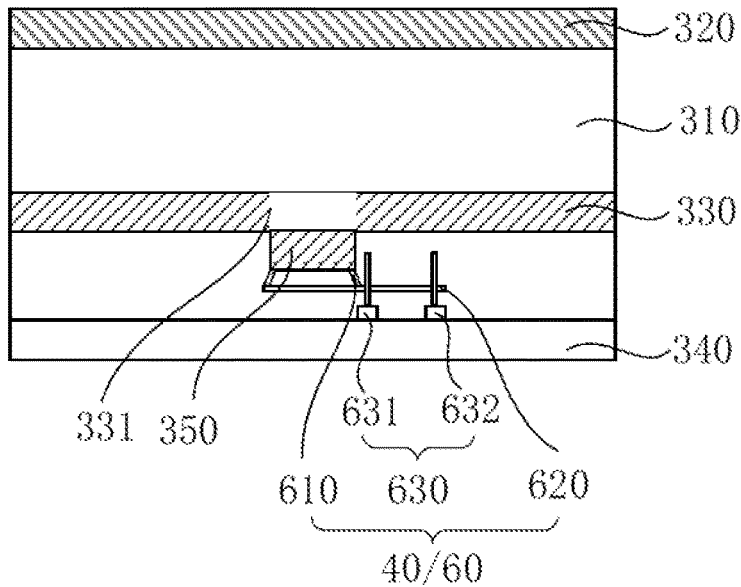
FIG. 6 is a schematic diagram of a display device is a first moving state in a second embodiment of the present application.
Figure 7:
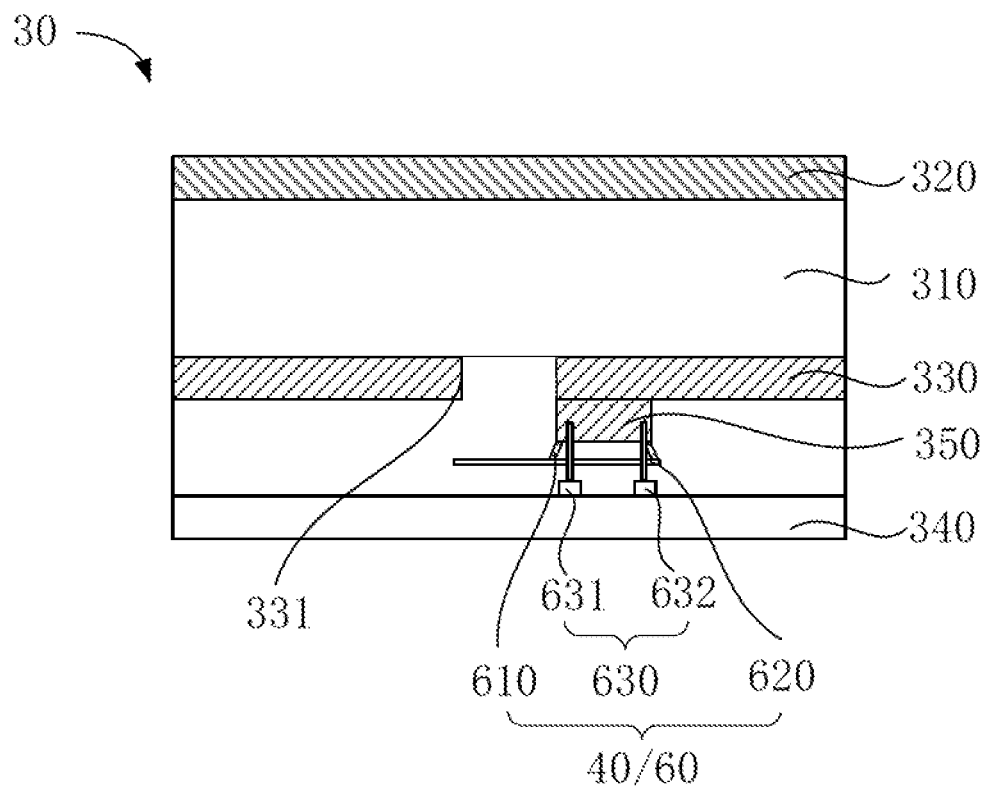
FIG. 7 is a schematic diagram of the display device in a second moving state in the second embodiment of the present application.
Figure 8:
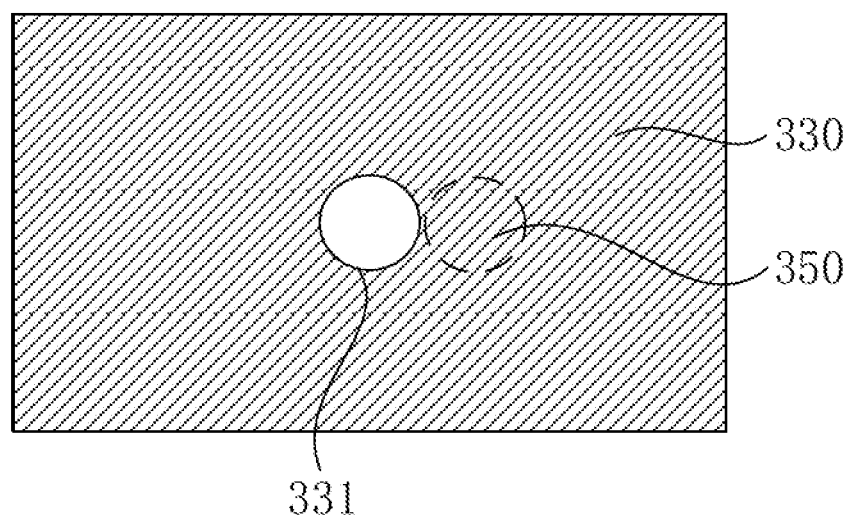
FIG. 8 is a schematic top view of a polarizer in a second state in the second embodiment of the present application.

FIG. 5 is a schematic diagram of a display device according to a second embodiment of the present application. FIG. 6 is a schematic diagram of a first moving state of a display device according to the second embodiment of the present application. FIG. 7 is a schematic diagram of a second moving state of a display device according to the second embodiment of the present application. FIG. 8 is a schematic top view of a second state of the polarizer under the second embodiment of the present application. As shown in FIGS. 5-8, as the second embodiment of the present application, the difference from the first embodiment is that the polarizing structure 350 is arranged corresponding to the opening 331, and can be removed from the opening 331 to expose the opening 331. The control structure 40 includes moving mechanism 60. The moving mechanism 60 is connected to the housing 340. The moving mechanism 60 is connected with the polarizing structure 350, and controls the polarizing structure 350 to block or move out of the opening 331. When the polarizing structure 350 blocks the opening 331, and the polarization orientation of the polarizing structure 350 is perpendicular to the polarization orientation of the upper polarizer 320, the control structure 40 is in a non-operating state. At this time, the opening 331 is in a light-shielding state. When the polarizing structure 350 is moved out of the opening 331, and the opening 331 is exposed, and so there is no polarization orientation at the opening 331, then the control structure 40 is in the operating state. At this time, the light passing through the polarization orientation of the upper polarizer 320 can pass through the opening 331, and the opening 331 is in a light admission state.

In this embodiment, the polarizing structure 350 is disposed corresponding to the opening 331. The control structure 40 includes a moving mechanism 60. The moving mechanism 60 can be fixed to the back plate. The moving mechanism 60 is connected with the polarizing structure 350. The moving mechanism 60 is operative to control the polarizing structure 350 to move in or out from the opening 331 in a moving manner, thus blocking or moving out of the opening 331. Furthermore, when the control structure 40 is in a non-working or working condition, the polarization orientation of the polarizing structure 350 is both perpendicular to the polarization orientation of the upper polarizer 320. When the polarizing structure 350 shields the opening 331, the control structure 40 is in a non-operating state, and the opening 331 is in a light-shielding state. At this time, the camera module 20 is in a non-shooting state. When the polarizing structure 350 is removed from the opening 331 to expose the opening 331, there is no polarization orientation restriction at the opening 331, the control structure 40 is in an operating state, and the opening 331 is in a light admission state. At this time, the camera module 20 is in a shooting state. At this time, the polarizing structure 350 can be arranged in the opening 331 or between the lower polarizer 330 and the camera module 20, which both can change the light-shielding or light admission state at the opening 331 of the camera module 20 by moving.

Specifically, take the cross-sectional area of the polarizing structure 350 being less than or equal to the cross-sectional area of the opening 331 as an example. The polarizing structure 350 is arranged in the opening 331. The moving mechanism 60 includes a connecting stage 610, a moving belt 620 and a moving motor group 630. The moving belt 620 is connected to the housing 340. One end of the connecting stage 610 is connected with the polarizing structure 350, and the other end is connected with the moving belt 620. The mobile motor group 630 includes a first motor 631 and a second motor 632. The first motor 631 and the second motor 632 are each in driving connection with the moving belt 620. The first motor 631 drives the moving belt 620 to move in the vertical direction, so as to drive the polarizing structure 350 to move in or out from the opening 331 in the vertical direction through the connecting stage 610. The second motor 632 drives the moving belt 620 to move in the horizontal direction, so as to drive the polarizing structure 350 to move in the horizontal direction through the connecting stage 610.

The moving mechanism 60 includes the connecting stage 610, the moving belt 620 and the moving motor group 630. The polarizing structure 350 is connected with the moving belt 620 through the connecting stage 610, and the transmission of the moving belt 620 is controlled by a translation motor, so as to drive the polarizing structure 350 to move through the connecting stage 610. The connecting stage 610 can be a hollow cylinder, or at least two posts are evenly arranged on the edge of the polarizing structure 350 to ensure that the camera module 20 can receive light normally. When the polarizing structure 350 is disposed in the opening 331, the polarization orientation of the polarizing structure 350 is perpendicular to the polarization orientation of the upper polarizer 320, and at this time the area between the upper polarizer 320 and the lower polarizer 330, and the area between the upper polarizer 320 and the polarizing structure 350 are all shaded from light. At this time, the display device 30 is in a normal display state.

When the camera module 20 needs to activate the shooting function, since the polarizing structure 350 is located in the opening 331, the polarizing structure 350 needs to be removed from the opening 331 first, and then the polarizing structure 350 can be removed from the opening 331. Therefore, the mobile motor group 630 includes a first motor 631 and a second motor 632. The first motor 631 and the second motor 632 are each connected with the moving belt 620 in a driving manner. The first motor 631 drives the moving belt 620 to move in the vertical direction, so as to drive the polarizing structure 350 to move in or out from the opening 331 in the vertical direction through the connecting stage 610, so that the polarizing structure 350 is located in the opening 331 or located outside of the opening 331 (the outside refers to the outside of the surface of the lower polarizer 330 on the side away from the display panel 310). As shown in FIG. 5, when the polarizing structure 350 moves to the outside of the opening 331, the display device 30 is in the first state. The second motor 632 drives the moving belt 620 to move in the horizontal direction, so as to drive the polarizing structure 350 to move in the horizontal direction through the connecting stage 610. As shown in FIG. 6, when the polarizing structure 350 moves to the outside of the opening 331, the second motor 632 drives the moving belt 620 to move in the horizontal direction, and drives the polarizing structure 350 to move in the horizontal direction through the connecting stage 610 and move away from the opening 331. When the opening 331 is exposed, the display device 30 is in the second state.

Therefore, when the control structure 40 is in a non-operating state, the polarizing structure 350 is located in the opening 331. When the control structure 40 is in the operating state, the first motor 631 must be driven to move the polarizing structure 350 out of the opening 331 first. Until the polarizing structure 350 is located outside the opening 331, the second motor 632 can be driven to drive the moving belt 620 to move in the horizontal direction. Thus, the polarizing structure 350 is moved away from the opening 331 through the connecting stage 610 to expose the opening 331 to ensure that the camera module 20 is in a light admission state, thereby ensuring the light transmittance of the camera module 20 and improving the imaging quality.

Embodiment 3

Figure 9:
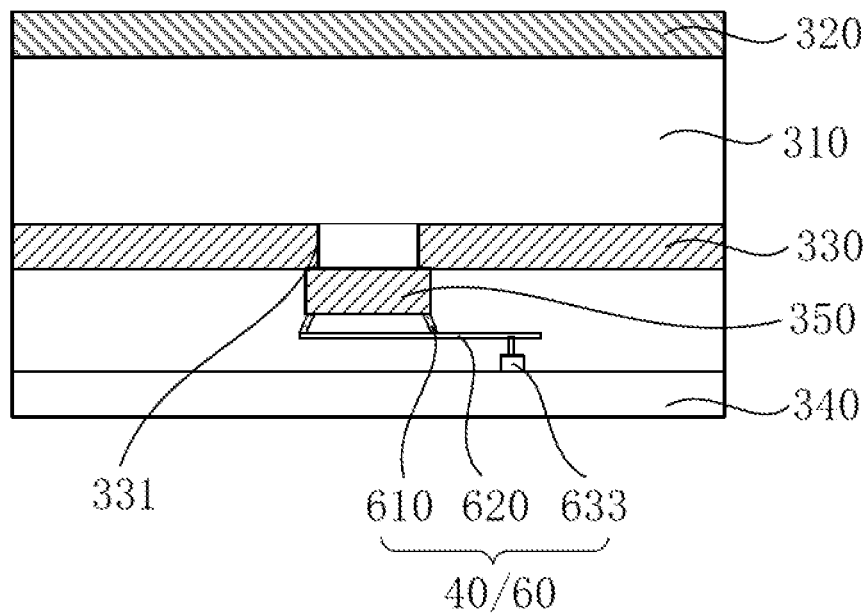
FIG. 9 is a schematic diagram of a display device according to a third embodiment of the present application.
Figure 10:
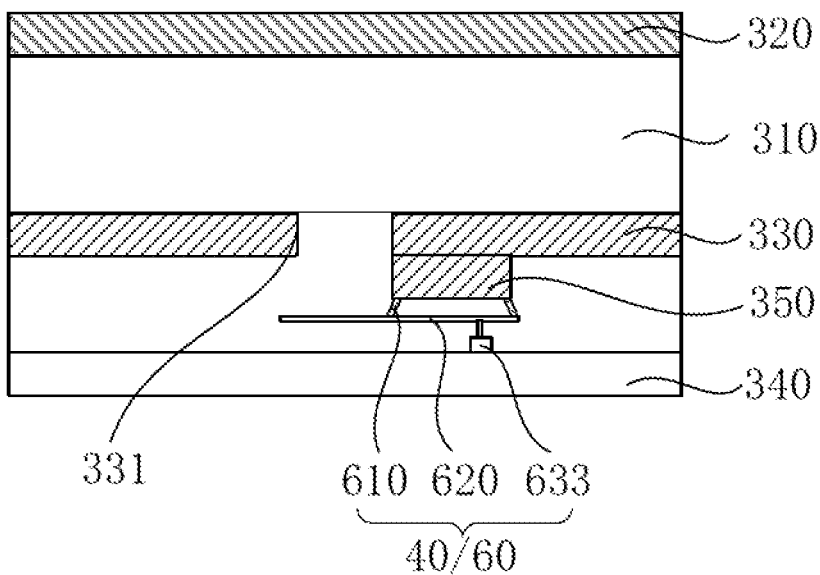
FIG. 10 is a schematic diagram of a moving state of a display device according to a third embodiment of the present application.

FIG. 9 is a schematic diagram of a display device according to a third embodiment of the present application. FIG. 10 is a schematic diagram of a moving state of the display device according to the third embodiment of the present application. Referring to FIGS. 9 and 10, as the third embodiment of the present application, the difference from the second embodiment includes: the polarizing structure 350 is disposed on the side of the lower polarizer 330 away from the display panel 310; the moving mechanism 60 includes a connecting stage 610, a moving belt 620 and a third motor 633; the moving belt 620 is connected to the housing 340, one end of the connecting stage 610 is connected to the polarizing structure 350, and the other end is connected to the moving belt 620; a third motor 633 is drivingly connected with the moving belt 620, and the third motor 633 drives the moving belt 620 to move in the horizontal direction, so as to drive the polarizing structure 350 to move in or out from the opening 331 through the connecting stage 610.

In this embodiment, the polarizing structure 350 moves in a translational manner, and the polarization orientation of the polarizing structure 350 is perpendicular to the polarization orientation of the upper polarizer 320. The polarizing structure 350 can be arranged between the lower polarizer 330 and the housing 340, and the polarizing structure 350 corresponds to the opening 331, and can be arranged in such a manner as attached to the surface of the lower polarizer 330 away from the display panel 310. The moving mechanism 60 includes a connecting stage 610, a moving belt 620 and a third motor 633. One end of the connecting stage 610 is connected with the polarizing structure 350, and the other end is connected with the moving belt 620. The connecting stage 610 can be a plate-like or strip-like structure, arranged on the edge of the polarizing structure 350, and can be located on any side in the horizontal direction. The third motor 633 drives the moving belt 620 to move in the horizontal direction, so as to drive the polarizing structure 350 to move in or out from the opening 331 through the connecting stage 610.

When the camera module 20 is in the non-shooting state, the control structure 40 is in the non-operating state, the polarizing structure 350 is correspondingly disposed at the opening 331, and is located below the lower polarizer 330 blocking the opening 331, and the polarization orientation of the polarizing structure 350 is perpendicular to the polarization orientation of the upper polarizer 320, which plays the role of shading and prevents external light from affecting the display effect. When the shooting function of the camera module 20 is activated, the control structure 40 is in the operating state, and the polarizing structure 350 is moved away from the opening 331 in a translational manner, exposing the opening 331, so that the opening 331 is in a light admission state, which can ensure the normal shooting function of camera module 20.

Specifically, the cross-sectional area of the polarizing structure 350 may be set larger than the cross-sectional area of the opening 331. The cross-sectional areas of the polarizing structure 350 and the opening 331 refers to the orthographic projected areas of the polarizing structure 350 and the opening 331 on the lower polarizer 330, that is, the horizontal cross-sectional area. When the shape of the cross-section (referring to the horizontal cross-section) of each of the opening 331 and the polarizing structure 350 is set as a circle, the comparison can be made by the diameter. For example, setting the diameter of the polarizing structure 350 to be larger than the diameter of the opening 331 can avoid light leakage at the edge of the opening 331. For example, the edges of the polarizing structure 350 and the opening 331 may be misaligned and a gap is formed, resulting in light leakage. In addition, the size of the polarizing structure 350 is set to be larger than the size of the opening 331, which can also ensure that the polarizing structure 350 can block the edge of the opening 331 during the moving process to ensure the shading effect, thereby ensuring the display effect of the display device 30.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The technical solutions of the present application can be widely used in various display panels, such as TN (Twisted Nematic) display panels, IPS (In-Plane Switching) display panels, VA (Vertical Alignment) display panels, and MVA (Multi-Domain Vertical Alignment) display panels panel. Of course, other types of display panels, such as OLED (Organic Light-Emitting Diode) display panels, may also be applicable to the above solutions.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display device, comprising a display panel, an upper polarizer, and a lower polarizer; wherein the upper polarizer is disposed on a side of a light-emitting surface of the display panel, and the lower polarizer is disposed on a side of a light-incident surface of the display panel;
wherein the display device further comprises a housing, a control structure, and a polarizing structure; wherein the control structure is connected to the housing; the lower polarizer defines an opening corresponding to a camera module; the polarizing structure is disposed corresponding to the opening; and the control structure is configured to control the polarizing structure to move or rotate relative to the lower polarizer at the opening;
wherein when the control structure is in a non-operating state, a polarization orientation of the polarizing structure at the opening is perpendicular to a polarization orientation of the upper polarizer;
wherein when the control structure is in an operating state, the polarization orientation of the polarizing structure at the opening is parallel to the polarization orientation of the upper polarizer, or the polarizing structure is moved out of the opening;
wherein the polarizing structure is disposed in the opening; wherein the control structure comprises a rotation mechanism connected to the housing, and wherein the rotation mechanism is connected to the polarizing structure and is configured to control the polarizing structure to rotate in the opening;
wherein when the polarization orientation of the polarizing structure is rotated to be perpendicular to the polarization orientation of the upper polarizer, the control structure is in the non-operating state;
wherein when the polarization orientation of the polarizing structure is rotated to be parallel to the polarization orientation of the upper polarizer, the control structure is in the operating state.

2. The display device of claim 1, wherein the rotation mechanism comprises a support body, a rotary gear, and a driving motor; the rotary gear is arranged on the housing; the support body is hollow inside; an edge of one end of the support body is fixedly connected to the polarizing structure, and the other end of the support body is connected to the rotary gear; and the driving motor is connected with the rotary gear and is operative to drive the rotary gear to rotate.

3. The display device of claim 2, wherein a cross-sectional width of the support body gradually increases from an end adjacent to the polarizing structure to an end adjacent to the camera module; wherein a reflective layer is disposed on an inner wall of the support body or the support body is made of a reflective material.

4. A display device, comprising a display panel, an upper polarizer, and a lower polarizer; wherein the upper polarizer is disposed on a side of a light-emitting surface of the display panel, and the lower polarizer is disposed on a side of a light-incident surface of the display panel;
wherein the display device further comprises a housing, a control structure, and a polarizing structure; wherein the control structure is connected to the housing; the lower polarizer defines an opening corresponding to the camera module; the polarizing structure is disposed corresponding to the opening; and the control structure is configured to control the polarizing structure to move or rotate relative to the lower polarizer at the opening;
wherein when the control structure is in a non-operating state, a polarization orientation of the polarizing structure at the opening is perpendicular to a polarization orientation of the upper polarizer;
wherein when the control structure is in an operating state, the polarization orientation of the polarizing structure at the opening is parallel to the polarization orientation of the upper polarizer, or the polarizing structure is moved out of the opening, wherein the control structure comprises a moving mechanism connected to the housing; wherein the moving mechanism is connected to the polarizing structure and is configured to control the polarizing structure to block or move out of the opening;
wherein when the polarizing structure blocks the opening and the polarization orientation of the polarizing structure is perpendicular to the polarization orientation of the upper polarizer, then the control structure is in the non-operating state; and
wherein when the polarizing structure is moved out of the opening and there is no polarization orientation at the opening, the control structure is in the operating state.

5. The display device of claim 4, wherein the polarizing structure is arranged in the opening; the moving mechanism comprises a connecting stage, a moving belt, and a moving motor group; the moving belt is connected to the housing; one end of the connecting stage is connected to the polarizing structure, and the other end of the connecting stage is connected to the moving belt;
the moving motor group comprises a first motor and a second motor, each connected to the moving belt; the first motor is operative to drive the moving belt to move in a vertical direction, and the second motor is operative to drive the moving belt to move in a horizontal direction.

6. The display device of claim 4, wherein the polarizing structure is disposed on a side of the lower polarizer away from the display panel;
   wherein the moving mechanism comprises a connecting stage, a moving belt, and a third motor; the moving belt is connected to the housing; one end of the connecting stage is connected to the polarizing structure, and the other end of the connecting stage is connected to the moving belt; wherein the third motor is drivingly connected to the moving belt, and is operative to drive the moving belt to move in a horizontal direction.

7. The display device of claim 6, wherein a projected area of the polarizing structure on the lower polarizer is greater than or equal to a cross-sectional area of the opening.

8. An electronic device, comprising a camera module and a display device, wherein the display device comprises a display panel, an upper polarizer, and a lower polarizer; wherein the upper polarizer is disposed on a side of a light-emitting surface of the display panel, and the lower polarizer is disposed on a side of a light-incident surface of the display panel;
   wherein the display device further comprises a housing, a control structure, and a polarizing structure; wherein the control structure is connected to the housing; the lower polarizer defines an opening corresponding to the camera module; the polarizing structure is disposed corresponding to the opening; and the control structure is configured to control the polarizing structure to move or rotate relative to the lower polarizer at the opening;
   wherein when the control structure is in a non-operating state, a polarization orientation of the polarizing structure at the opening is perpendicular to a polarization orientation of the upper polarizer;
   wherein when the control structure is in an operating state, the polarization orientation of the polarizing structure at the opening is parallel to the polarization orientation of the upper polarizer, or the polarizing structure is moved out of the opening
   wherein the camera module is disposed corresponding to the position of the opening;
   wherein the polarizing structure is disposed in the opening; wherein the control structure comprises a rotation mechanism connected to the housing, and wherein the rotation mechanism is connected to the polarizing structure and is configured to control the polarizing structure to rotate in the opening;
   wherein when the polarization orientation of the polarizing structure is rotated to be perpendicular to the polarization orientation of the upper polarizer, the control structure is in the non-operating state;
   wherein when the polarization orientation of the polarizing structure is rotated to be parallel to the polarization orientation of the upper polarizer, the control structure is in the operating state.

9. The electronic device of claim 8, wherein the rotation mechanism comprises a support body, a rotary gear, and a driving motor; the rotary gear is arranged on the housing; the support body is hollow inside; an edge of one end of the support body is fixedly connected to the polarizing structure, and the other end of the support body is connected to the rotary gear; and the driving motor is connected with the rotary gear and is operative to drive the rotary gear to rotate.

10. The electronic device of claim 9, wherein a cross-sectional width of the support body gradually increases from an end adjacent to the polarizing structure to an end adjacent to the camera module; wherein a reflective layer is disposed on an inner wall of the support body or the support body is made of a reflective material.

11. The display device of claim 10, wherein the rotating gear is located below the camera module, and the camera module is arranged inside the support body; wherein a width of an upper end of the support body is set to be 1.1-1.2 times a width of the camera module on a side adjacent to the polarizing structure.

12. The electronic device of claim 8, wherein a cross-sectional area of the opening is greater than or equal to an orthographic projected area of the camera module on the lower polarizer.

13. The electronic device of claim 12, wherein a ratio of the cross-sectional area of the opening to the orthographic projected area of the camera module on the lower polarizer is set to lies in the range between 1:1 and 1.2:1.

14. The electronic device of claim 12, wherein a center of the opening is arranged to coincide with a center of the camera module.

* * * * *